United States Patent Office 3,033,778
Patented May 8, 1962

3,033,778
CATALYTIC CONVERSION IN THE PRESENCE OF CARBON DIOXIDE PROMOTED CRYSTALLINE METAL ALUMINOSILICATES
Vincent J. Frilette, Erlton, N.J., assignor to Socony Mobil Oil Company, Inc., a corporation of New York
No Drawing. Filed Nov. 7, 1958, Ser. No. 772,418
15 Claims. (Cl. 208—120)

This invention relates to a process for catalytically transforming certain classes of organic compounds in the presence of a unique catalyst, the activity of which is unexpectedly enhanced or promoted by the presence in the reaction mixture of gaseous carbon dioxide. More particularly, the present invention is concerned with a method wherein an organic charge undergoes catalytic conversion in the presence of gaseous carbon dioxide and a catalyst consisting essentially of specified crystalline aluminosilicate salts.

As disclosed in copending application Serial Number 763,433, filed September 26, 1958, various chemical reactions may be advantageously carried out by contact catalysis utilizing as catalysts, crystalline metal aluminosilicates having rigid three dimensional networks made up of unit cells characterized by the substantial absence of change in unit cell dimensions upon dehydration and rehydration and a sorption capacity at 760 mm. pressure and 25° C. of at least 4 weight percent of normal butane. The above requirements are fulfilled by certain crystalline zeolites know as molecular sieves. The reactions effectively catalyzed by such materials include, by way of example, hydrocarbon cracking, alkylation, dealkylation, isomerization and polymerization.

The ability of the above catalysts to influence and direct the course of chemical conversions entails an unusual degree of desirable catalytic selectivity. Briefly, two types of selectivity are involved; first geometrical selectivity, which depends on the relationship between the diameter of the ports in the crystal structure of the aluminosilicate zeolite and the diameters of the reactant and product molecules, and second, intrinsic catalytic selectivity, which depends on the choice of cations present on the internal surface of the crystalline aluminosilicate salt.

In accordance with the present invention, it has now been discovered that the catalytic characteristics of the above-indicated crystalline aluminosilicate salts are enhanced and advantageously promoted when catalytic transformation with such materials is carried out in the presence of gaseous carbon dioxide. Thus, it has been found that the presence of carbon dioxide in the reaction zone increases the rate of a catalytic conversion reaction, such as paraffin cracking, under conditions for which catalytic activity already exists. Further, it has been found that the presence of gaseous carbon dioxide is effective in promoting a catalytic reaction, such as dehydration of alcohols, even under conditions for which little or no catalytic activity is discernable in its absence. Also, it has been found that selective double-bond isomerization of an olefin is promoted by the presence of gaseous carbon dioxide without any substantial loss of selectivity. Thus, with the present invention, it has been discovered that the presence of an inexpensive and readily available adjuvant, namely carbon dioxide, which itself does not possess any catalytic activity, unexpectedly enhances the catalytic activity and utility of the crystalline aluminosilicate zeolites.

In one embodiment, the present invention provides a method for transforming organic compounds, catalytically convertible in the presence of acidic catalyst sites, by contacting the same under conversion conditions with a catalyst of a crystalline aluminosilicate salt, particularly crystalline alkali metal and alkaline earth metal aluminosilicates having rigid three dimensional networks made up of unit cells characterized by the substantial absence of change in unit cell dimensions upon dehydration and rehydration and a sorption capacity at 760 mm. pressure and 25° C. of at least 4 weight percent of normal butane and in the presence of a sufficient amount of gaseous carbon dioxide to effectively enhance the activity of such catalyst.

In another embodiment, the invention affords a method for cracking a hydrocarbon charge in the presence of carbon dioxide and the above crystalline aluminosilicate catalyst.

In a further embodiment, the invention resides in a method for effecting dehydration of an alcohol having from 3 to 6 carbon atoms in the presence of carbon dioxide and the above crystalline aluminosilicate catalyst.

In still another embodiment, the invention resides in a method for effecting hydration of olefins having from 2 to 6 carbon atoms to the corresponding alcohols in the presence of carbon dioxide and the above crystalline aluminosilicate catalyst.

In yet another embodiment, the invention comprises double bond isomerization of olefins in the presence of carbon dioxide and the above crystalline aluminosilicate catalyst.

The metal aluminosilicates employed as catalysts in the process of this invention are essentially dehydrated forms of crystalline siliceous zeolites, containing varying quantities of sodium, calcium and aluminum with or without other metals. All or a portion of the sodium and calcium ions normally contained in the zeolite structure may be replaced with a number of other ions. The atoms of sodium, calcium or metals in replacement thereof, silicon, aluminum and oxygen are arranged in a definite and consistent crystalline pattern. Such structure contains a large number of small cavities, interconnected by a number of still smaller channels. These cavities and channels are precisely uniform in size. Chemically, these zeolites may be represented by the general formula:

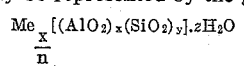

where Me is a metal cation, $$\frac{x}{n}$$

is the number of exchangeable metal cations of valence $n$, $x$ is also the number of aluminum ions combined in the form of aluminate, $y$ is the number of silicon atoms and $z$ is the number of water molecules, removal of which produces the characteristic channel system. In the above formula, the ratio $y/x$ is a number from 1 to 5 and usually from 1 to 2. Zeolites having the above characteristics have sometimes been referred to as molecular sieves. At the present time, there are commercially available molecular sieves of the "A" series and of the "X" series. A synthetic zeolite known as "Molecular Sieve 4A" is a crystalline sodium aluminosilicate having channels about 4 Angstroms in diameter. In the hydrated form, this material is chemically characterized by the formula: $Na_{12}(AlO_2)_{12}(SiO_2)_{12} \cdot 27H_2O$. The synthetic zeolite known as "Molecular Sieve 5A" is a crystalline aluminosilicate salt having channels about 5 Angstroms in diameter and in which substantially all of the 12 ions of sodium in the immediately above formula are replaced by calcium, it being understood that calcium replaces sodium at the rate of one calcium ion for two sodium ions. A crystalline sodium aluminosilicate which has pores or channels of approximately 13 Angstrom units in diameter is also available commercially under the name of "Molecular Sieve 13X." The letter "X" is used to distinguish the inter-atomic structure of this zeolite from that of the "A" crystals mentioned above. As prepared, the 13X material contains water and has the unit cell formula $Na_{86}[(AlO_2)_{86}(SiO_2)_{106}] \cdot 267H_2O$. The parent zeolite is dehydrated to make the active catalyst. The 13X crystal is structurally identical with faujasite, a naturally occurring zeolite. Faujasite, however, is not identical in composition with the 13X zeolite. The synthetic zeolite known as "Molecular Sieve 10X" is a crystalline aluminosilicate salt having channels above 10 Angstrom units in diameter and in which a substantial proportion of the sodium ions of the 13X material have been replaced by calcium.

Molecular sieves of the "A" series consist fundamentally of a three-dimensional tetrahedral structure of silicon and aluminum. These tetrahedra are joined by sharing oxygen atoms in such a manner that the ratio of atoms of oxygen to the total number of atoms of aluminum and silicon is equal to two. The electrovalence of the tetrahedra containing aluminum is balanced by the inclusion in the crystal of a cation, for example, an alkali metal or an alkaline earth metal cation. This equilibrium can be expressed by formula wherein the ratio of $Al_2$ to the number of the various cations, such as Ca, Sr, $Na_2$, $K_2$ or $Li_2$ is equal to unity. One cation may be exchanged either in entirety or partially by another cation utilizing ion exchange techniques as discussed hereinbelow. The spaces between the tetrahedra are occupied by molecules of water prior to dehydration.

Molecular sieves of the "A" series are ordinarily prepared initially in the sodium form of the crystal. The sodium ions in such form may, as desired, be exchanged for other alkali metal or alkaline earth metal cations. In general, the process of preparation involves heating, in aqueous solution, an appropriate mixture of oxides, or of materials whose chemical composition can be completely represented as a mixture of oxides $Na_2O$, $Al_2O_3$, $SiO_2$ and $H_2O$ at a temperature of approximately 100° C. for periods of 15 minutes to 90 hours or more. The product which crystallizes within this hot mixture is separated therefrom and water-washed until the water in equilibrium with the zeolite has a pH in the range of 9 to 12. After activating by heating until dehydration is attained, the substance is ready for use.

The empirical formula for the zeolites utilized herein can be expressed as:

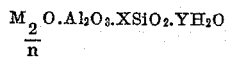

where M is a metal and $n$ is the valence of the metal. A specific crystalline zeolite has values of X and Y within a definite range. The value of X for any specific zeolite varies in a certain manner depending on whether aluminum or silicon atoms occupy equivalent positions in the lattice. For molecular sieves of the "A" series, X has an average value of $1.85 \pm 0.5$. The value of Y, depending on the condition of hydration and on the metal cation present may vary from 6 to 0. The average value of Y for the completely hydrated sodium zeolite of the "A" series is 5.1. In the above general formula, the ratio of $Na_2O$ to $Al_2O_3$ is equal to 1. However, if during the process of preparation, excess of the base present in the mother liquor is not eliminated by washing of the crystalline precipitate, analysis will show a ratio of slightly greater than 1. On the other hand, if the washing is excessive a certain amount of exchange of the sodium ions may occur bringing the aforementioned ratio to slightly less than 1. The ratio of

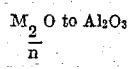

in the above general formula may accordingly be defined more accurately as being $1 \pm 0.2$.

Suitable reagents in the preparation of the sodium zeolite of the "A" series include silica gel, silicic acid or sodium silicate as sources of silica. Alumina can be supplied by utilizing activated alumina, gamma alumina, alpha alumina, aluminum trihydrate or sodium aluminate. Sodium hydroxide is suitably used as the source of the sodium ion and in addition contributes to the regulation of the pH. All reagents are preferably soluble in water. The reaction solution has a composition, expressed as mixtures of oxides, within the ranges $SiO_2/Al_2O_3$ of 0.5 to 2.5, $Na_2O/SiO_2$ of 0.8 to 3.0 and $H_2O/Na_2O$ of 35 to 200. The reaction mixture is placed in a suitable vessel which is closed to the atmosphere in order to avoid losses of water and the reagents are then heated for an appropriate length of time. A convenient and generally employed process of preparation involves preparing an aqueous solution of sodium aluminate and sodium hydroxide and then adding with stirring an aqueous solution of sodium silicate. It is to be noted that the material first formed on mixing the above solutions in an amorphous precipitate generally catalytically inactive in the process of the invention. It is only after transformation of the amorphous precipitate to a crystalline form that the highly active catalyst described herein is obtained. While satisfactory crystallization may be obtained at temperatures from 21° C. to 150° C., the pressure being atmospheric or less, corresponding to the equilibrium of the vapor pressure with the mixture at the reaction temperature, crystallization is ordinarily carried out at about 100° C. For temperatures between room temperature (21° C.) and 150° C. an increase in temperature increases the velocity of the reaction and decreases its duration. As soon as the zeolite crystals are completely formed, they retain their structure and it is not essential to maintain the temperature of the reaction any longer in order to obtain a maximum yield of crystals. The initially obtained inactive precipitate may be distinguished from the highly active crystalline material by the fact that the former gives no X-ray diffraction pattern characteristic of large repeating distances while the latter gives a very well defined and characteristic X-ray diffraction pattern.

After formation, the crystalline zeolite is separated from the mother liquor, usually by filtration. The crystalline mass is then washed, preferably with distilled water, and while on the filter, until the wash water, in equilibrium with the zeolite, reaches a pH of 9 to 12. The crystals are then dried at a temperature between 25° C. and 150° C. Activation is attained upon dehydration. The resulting crystalline zeolite has rigid three dimensional networks made up of unit cells characterized by the substantial absence of change in unit cell dimensions upon dehydration and rehydration. While such property is a useful and necessary characteristic of the catalytically active aluminosilicate salt employed in the process of the present invention, it is not a sufficient condition. It has been found that crystalline zeolites which sorb more than 4 weight percent of normal butane at 760 mm. and 25° C. are active hydrocarbon conversion catalysts, while those which sorb less than 4 weight percent and particularly less than 2 weight percent normal butane under the foregoing conditions are catalytically inactive in the process of the invention. It is further to be noted that the sorptive capacity for normal butane may be affected very strongly by the ionic form of the crystal. In this regard, it may be noted that the sodium form of the zeolite of the "A" series, i.e. "Molecular Sieve 4A" has no substantial sorptive capacity for normal butane, less than 2 weight percent of butane being sorbed at 760 mm. pressure and 25° C. and is catalytically inactive in the process of the present invention. However, such inactive form may be rendered highly sorptive for butane and highly active in catalytically converting hydrocarbons in the present process by the simple procedure of cation exchange of calcium for sodium after crystallization. By base exchanging the sodium aluminosilicate salt with a calcium ion-containing solution, the salt develops a high sorption capacity for normal butane, being greater than 8 weight percent at 760 mm. and 25° C. and becomes catalytically active.

The sodium ions of the above zeolite may thus be replaced partially or completely by other metal cations. Suitable replacing ions include particularly those of other alkali metals such as lithium and potassium, alkaline earth metals such as calcium, strontium, and magnesium as well as various other ions such as those of cobalt, zinc, silver, nickel, and ammonium which are capable of replacing sodium ions without occassioning any appreciable change in the fundamental structure of the crystalline zeolite. Replacement is suitably accomplished by contacting the crystalline sodium aluminosilicate zeolite with a solution of an ionizable compound of the metal ion which is to be zeolitically introduced into the molecular sieve structure for a sufficient time to bring about the extent of desired introduction of such ion. After such treatment, the resulting exchanged product is water-washed and dried and thereafter is ready for use. The extent to which exchange takes place can be controlled. Thus, taking the exchange of sodium for calcium as a typical example, such exchange can be effected in a proportion of less than 5 percent up to 100 percent. One method of regulation of the degree of exchange consists of impregnating a known amount of the sodium zeolite with solutions containing determined amounts of exchangeable ions. In contacting the sodium zeolite of the "A" series and calcium ions, whenever the total available calcium in the solution is 5 percent of the quantity which could enter in the zeolite if all the sodium ions were to be replaced, effectively 5 percent of the sodium ions are replaced after about 20 minutes contact at room temperature. By using a three-fold excess of the amount of calcium theoretically necessary to obtain a complete exchange, a replacement of about 77 percent of the sodium ions is obtained in 20 minutes at room temperature. A more complete exchange can be effected if the temperature of contact is raised to 100° C. or if the exchange operation is repeated several times by replacing the used solution with a freshly formed solution. In such manner, a sodium zeolite of the "A" series may have all of its sodium replaced by calcium.

Sodium zeolite of the "A" series exchanged with calcium possesses larger pores than the unexchanged material. An unusual characteristic of the calcium exchanged zeolite is that the opening of the pores is not accomplished progressively as the sodium ions are replaced by calcium ions but is produced within a fairly narrow range of composition. When the exchange is 25 percent or less, the substance possesses substantially the same pore characteristics as the sodium zeolite of the "A" series, namely a pore diameter of about 4 Angstrom units. However, when the exchange exceeds 40 percent, the pore characteristics become those of the calcium zeolite of the "A" series, i.e. a pore diameter of about 5 Angstrom units. This remarkable effect is evident, for example, by the amount of normal heptane adsorbed on the sodium zeolite of the "A" series with increasing replacement of the sodium ions therein with calcium as shown below:

| Percent of Sodium Ions Replaced in Molecular Sieve 4A By Calcium Ions | Wt. Percent Normal Heptane Adsorbed at 25° C. Under 45 mm. of Mercury |
|---|---|
| 0 | 0.1 |
| 10 | 0.1 |
| 25 | 1.3 |
| 40 | 13.8 |
| 70 | 15.5 |
| 100 | 16.5 |

As noted hereinabove, there are numerous forms of zeolites of the "A" series having exchanged ions. While generally, the substances containing a divalent alkaline earth metal have pore size characteristics analogous to those of calcium, the exact port size will differ. Such property can be advantageously employed in the process of the present invention in affording control of port size by suitable selection of a particular cation. Similarly, the substances having a monovalent alkali metal ion have pore size characteristics similar to the sodium zeolite of such series, but the precise port size is subject to similar control and selection.

Molecular sieves of the "X" series are characterized by the formula:

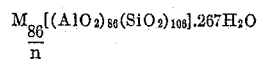

where M is Na+ or Ca++ or other alkali metal or alkaline earth metal ions introduced by replacement thereof and $n$ is the valence of the cation M. The structure consists of a complex assembly of 192 tetrahedra in a large cubic unit cell 24.95 A. on an edge. The effective pore diameter is 10 to 13 A. and the adsorption volume is about 0.35 cc./gram of dehydrated zeolite.

For molecular sieves of this series, in the empirical formula:

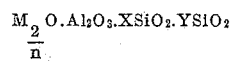

X has an average value of 2.5±0.5. The value of Y, depending on the condition of hydration and on the metal cation present may vary from 8 to 0. The average value of Y for the completely hydrated sodium zeolite of the "X" series is 6.2.

Molecular sieves of the "X" series are prepared in a manner similar to that described hereinabove for preparation of molecular sieves of the "A" series. However, for synthesis of the "X" series molecular sieves, the reaction mixture has a composition, expressed as mixtures of oxides, within the following limits: $SiO_2/Al_2O_3$ of 3 to 5, $Na_2O/SiO_2$ of 1.2 to 1.5 and $H_2O/Na_2O$ of 35 to 60.

Although the effectiveness of gaseous carbon dioxide as a promoter has been observed with different ionic forms of the above-described crystalline aluminosilicates, preference is accorded the alkali and alkaline earth aluminosilicate salts. A very marked effect of carbon dioxide gas as a promoter has been realized with alkali metal aluminosilicates having a uniform structure characterized by pores of approximately 13 Angstroms in diameter. Sodium aluminosilicate of such characteristics, i.e., Molecular Sieve 13X, has specifically been found to be susceptible to marked improvement in catalytic properties in the presence of gaseous carbon dioxide and such material is accordingly particularly preferred for use as a catalyst in the process of the invention.

Carbon dioxide and carbon dioxide-containing gases useful in the practice of this invention have the advantage of being economical and readily available. It is contemplated that gaseous carbon dioxide for use in the present process may be obtained from any feasible source. Thus, one suitable source is the waste gases produced in combustion of hydrocarbon fuels. It will be understood that the amount of gaseous carbon dioxide present is sufficient to effectively enhance the activity of the catalyst. The particular amount of carbon dioxide required to attain the desired promoting effect will vary depending on the specific catalyst employed and the nature of the catalytic process involved. Generally, however, carbon dioxide will be present in the reaction zone in an amount of between about 0.005 and about 25 percent by weight based on the catalyst. In continuous operations, a rate of feed of carbon dioxide of about 3.0 percent to about 200 percent by weight per hour based on the catalyst will generally be employed, although in some instances amounts as small as 0.7 weight percent per hour may be used. Although a continuous fed of carbon dioxide has been found to be most effective, particularly in continuous process operations, there are reactions in which a transient carbon dioxide contact produces a fairly long period of activation. In such cases, it is feasible to treat the catalyst intermittently with carbon dioxide rather than with a continuous stream. In processes operated on a batch basis, the supply of carbon dioxide may consist of part of the charge.

While carbon dioxide will generally be conducted, as such, to the reaction zone, it is contemplated that such gas may also be produced in situ during the course of the catalytic reaction. In this regard, promoting effects may be observed with the use of carbon monoxide. It is believed that the enhancing catalytic effect in such instance arises from a carbon dioxide-producing reaction with residual water on the catalyst in accordance with the following equation:

$$CO + H_2O \rightleftharpoons CO_2 + H_2$$

The use of carbon dioxide as a catalyst promoter has the further advantage of emerging from the reaction zone along with the products and being capable of easy separation therefrom. Thus, carbon dioxide emerging with any gaseous products may be removed, for example, by contacting the gases with a carbon dioxide sorbent such as a solution of caustic soda or soda ash. The presence of carbon dioxide in any liquid products is usually negligible since carbon dioxide solubility in most liquid products is sufficiently small so as not to be troublesome. If desired or necessary, however, liquid product may be substantially freed of carbon dioxide by heating or by washing the product with a suitable carbon dioxide sorbent such as a solution of caustic soda.

The reactions promoted by carbon dioxide with the crystalline aluminosilicate zeolites described herein involve conversion of certain classes of organic compounds including cracking of paraffinic, olefinic, aromatic and naphthenic hydrocarbons as well as mixtures thereof, for example petroleum fractions, such as those boiling in the gas oil range; dehydration of alcohols to olefins and ethers, particularly the dehydration of normal alcohols to ethers; hydration of olefins to alcohols; isomerization and polymerization of olefins; isomerization of terpenes; alkylation and dealkylation of aromatic hydrocarbons.

The cracking of hydrocarbons, and particularly normal hydrocarbon having a carbon chain of from 5 to 30 carbon atoms, represents an especially advantageous use of carbon dioxide promoted crystalline aluminosilicate catalysts since the nature of the products may be well controlled. The catalyst in such process may be used as pellets in a fixed bed operation or they may be used in a compact moving bed operation or in a fluidized operation. The general operating conditions cover a wide range because of the wide utility of the catalysts. In cracking paraffins for the production of olefins, the preferred catalyst is the sodium form of the "X" series of molecular sieves, i.e. "Molecular Sieve 13X." This process may be carried out at atmospheric pressure, employing a temperature in the approximate range of 700 to 1200° F. and preferably 800 to 950° F. The liquid hourly space velocity of the charge may range from 0.2 to 4.0, preferably from 0.5 to 2.0. The normal paraffins that may be charged range from $C_5$ to $C_{30}$ paraffins and mixtures thereof. Generally, the conversion of charge improves with increasing molecular weight, so that for hexane cracking, for example, the low ranges of space velocity and higher temperatures are desirable for satisfactory conversion. The cracking of other crackable hydrocarbons including aromatics containing alkyl chains, naphthenes and olefins is likewise advantageously carried out with the hereinabove-described catalysts in the presence of carbon dioxide.

Catalytic cracking with the carbon dioxide promoted crystalline aluminosilicate catalysts described herein may be carried out by contacting a crackable hydrocarbon charge at catalytic cracking conditions employing a temperature within the approximate range of 550 to 1100° F. and under a pressure ranging from subatmospheric pressure up to several hundred atmospheres. The contact time of the hydrocarbon charge with the catalyst is adjusted in any case according to the conditions, the particular charge stock and the particular results desired to give a substantial amount of cracking to lower boiling products.

Thus, as illustrative of the usefulness of this invention, it has been established that paraffinic hydrocarbons may be cracked over the carbon dioxide promoted sodium form of the "X" series of molecular sieves, i.e. "Molecular Sieve 13X" to afford a high yield of olefins. The latter are particularly desirable products since they are susceptible to a wide variety of useful applications. They may be employed, for example in the formation of high octane alkylate; they also may be used for the alkylation of benzene to form cumene and other alkyl benzenes; or they may be polymerized to liquid fuels or to form plastics such as polyethylene and polypropylene. In many instances, these desirable olefin products may be formed in high yields by cracking low-valued petroleum charge stocks, such as paraffinic materials in the $C_6$–$C_{10}$ range.

Dehydration of alcohols utilizing the carbon dioxide promoted crystalline aluminosilicate catalysts described herein is carried out by contacting a charge of either normal is isoalcohols of 3 to 6 carbon atoms at a temperature of between about 200° F. and about 650° F. Normal alcohols can, under such conditions, be effectively dehydrated to ethers, while isoalcohols are ordinarily dehydrated to olefins.

Isomerization of olefins utilizing the carbon dioxide promoted crystalline aluminosilicate catalysts described herein is generally carried out at a temperature of between about 30° F. and about 900° F.

In addition to cracking, dehydration, and isomerization, it is contemplated that carbon dioxide promotion may be used with the above-described crystalline aluminosilicate catalysts in various other reactions in which organic compounds undergo chemical conversion or transformation into useful products. While the specific mechanism of carbon dioxide promotion of the crystalline aluminosilicate catalysts is not fully understood, it would appear without being limited by any theory that the tenacity with which the aluminosilicate salts retain carbon dioxide may well result from chemisorption rather than ordinary physical adsorption of the Van der Waals type. Such chemisorption in turn might be represented by the formation of an inclusion metal carbonate complex releasing acidic sites according to the reaction:

$$Me_nX + H_2O + CO_2 \underset{}{\overset{\text{Excess } CO_2}{\rightleftharpoons}} H_2X + Me_nCO_3$$

where Me represents the metal cation of the aluminosilicate salt, $n$ is the valence of such metal cation, X represents the surface of the catalyst, $Me_nCO_3$ represents the inclusion carbonate and $H_2X$ the protonated catalyst surface which is present in effective quantities only in the presence of the carbon dioxide promoter.

The provision of a catalyst with a protonated surface of the type indicated above would account for the dehydration activity of the catalyst since alcohol dehydration is known to proceed in the presence of protonic acids. The promotion of paraffin cracking may also be accounted for in similar fashion. Other contemplated reactions susceptible to carbon dioxide promotion in the presence of the crystalline aluminosilicate catalysts described hereinabove include those for which acidic catalytic sites are useful. Thus, the isomerization of cycloolefins, such as terpenes and alkylcyclopentanes; the polymerization of olefins and vinylaromatic compounds; the alkylation and dealkylation of aromatics and the disproportionation of aromatics are all reactions which normally are catalyzed by acidic catalysts. The promotion of such reactions over the crystalline aluminosilicate catalysts referred to herein are thus logically to be included within the scope of the present invention.

The following examples will serve to illustrate the process of the invention without limiting the same:

Example 1

This example illustrates the activating effect of carbon dioxide, in contrast with an inert gas, nitrogen, when n-hexane is cracked in the presence of a crystalline sodium aluminosilicate characterized by uniform pores of approximately 13 Angstroms in diameter (Molecular Sieve 13X).

Fifty (50) cc. of Molecular Sieve 13X in pellet form were charged to a reacting vessel. Normal hexane was passed over this material at a liquid hourly space velocity of 1 while maintaining the temperature at 950° F. In this control run, no foreign gas was charged. The products of the reaction were accumulated and analyzed. The weight percent conversion of the charge to products other than hexane is a measure of catalytic activity.

A second comparative run was made under identical conditions with the exception that approximately one mole of an inactive gas, i.e. nitrogen was added per mole of charge and the mixed vapor and gas passed over the catalyst.

A third comparative run was made under conditions identical with those of the control runs except that one mole of carbon dioxide gas was added per mole of charge and the resulting mixture of hexane and carbon dioxide was passed over the catalyst.

The results obtained in each of the above runs are shown in Table I below:

|  | Experiment | | |
|---|---|---|---|
| Feed Composition | #1 | #2 | #3 |
| n-hexane, cc./hr | 50 | 50 | 50 |
| nitrogen, cu. ft./hr | 0 | 0.5 | 0 |
| carbon dioxide, cu. ft./hr | 0 | 0 | 0.5 |
| percent n-hexane cracked | 19.4 | 20.1 | 35.8 |

The enhanced activity of the catalyst in the presence of carbon dioxide is readily apparent from the foregoing data.

Example 2

This example illustrates the dehydration of isopropyl alcohol to propylene promoted by the presence of gaseous carbon dioxide in the presence of a crystalline sodium aluminosilicate characterized by uniform pores of approximately 13 Angstroms in diameter (Molecular Sieve 13X).

Ten grams of Molecular Sieve 13X, in pellet form, were charged to a reacting vessel. Ten cc. of isopropyl alcohol were passed over the pellets in a one hour period while the temperature was maintained at 400° F. Liquid isopropyl alcohol was recovered in substantial quantitative yield, showing the absence of catalytic conversion. Thus, the molecular sieve material possessed substantially no activity when used alone.

The above experiment was repeated with the exception that 0.1 cubic foot of gaseous carbon dioxide was fed with the alcohol vapor. In this case, approximately 40 percent of the isopropyl alcohol charged was converted to pure propylene and water with no substantial side reactions.

The passage of alcohol and carbon dioxide under the conditions of the above experiment was again repeated but in the absence of the molecular sieve material. No dehydration of the alcohol was obtained in this experiment, showing that the carbon dioxide gas itself is not a catalyst, but rather a promoter for the molecular sieve catalyst.

Example 3

Ten grams of Molecular Sieve 13X were charged to a reactor. Over a one hour period a mixture of 10.4 grams of n-propyl alcohol vapor and 4.4 grams of carbon dioxide was passed over the catalyst maintained at 455° F. The recovered liquid amounted to 9.3 grams and was found, upon analysis, to contain substantial quantities of di-n-propyl ether.

Example 4

This example illustrates the activating effect of carbon dioxide when cyclohexane is cracked in the presence of a crystalline calcium aluminosilicate characterized by uniform pores of approximately 10 Angstroms in diameter (Molecular Sieve 10X).

Cyclohexane was passed over a bed of Molecular Sieve 10X pellets at 950° F. and a liquid hourly space velocity of 1. The condensed products were analyzed for residual charge material. It was found that 5 percent conversion of charge to cracked products had occurred. In a repeat experiment in which the charge was diluted with about an equimolar amount of carbon dioxide, 15 percent of the charge was converted to cracked products.

Example 5

This example illustrates the activating effect of carbon dioxide when cumene is cracked in the presence of a crystalline calcium aluminosilicate characterized by uniform pores of approximately 10 Angstroms in diameter (Molecular Sieve 10X).

Cumene was passed over a bed of Molecular Sieve 10X pellets at 875° F. and a liquid hourly space velocity of 1. The condensed products were analyzed for residual charge material. It was found that 60 percent conversion of the charge to cracked products had occurred. In a repeat experiment in which the charge was diluted with an equimolar amount of carbon dioxide, 90 percent of the charge underwent conversion to cracked products.

Example 6

This example illustrates the selective double bond isomerization of an olefin promoted by the presence of gaseous carbon dioxide in the presence of a crystalline sodium aluminosilicate characterized by uniform pores of approximately 13 Angstroms in diameter (Molecular Sieve 13X).

Sixty cc. per minute of butene-1 were passed over 14.5 grams of Molecular Sieve 13X pellets maintained at a temperature of 510° F. The products were passed through a water condenser to effect condensation of polymers and then collected over caustic soda solution.

In a separate second run, the same reaction conditions were maintained but 60 cc. per minute each of butene-1 and carbon dioxide were charged.

The analyses of the products obtained in each run are set forth below:

|  | Run 1 Without $CO_2$, mol percent | Run 2 With $CO_2$, mol percent |
|---|---|---|
| Butene-1 | 63.8 | 20.8 |
| cis-Butene-2 | 18.8 | 30.2 |
| trans-Butene-2 | 15.7 | 44.6 |
| By-products | 1.7 | 4.4 |
|  | 100.0 | 100.0 |

It will be seen from the above data that a much higher conversion occurred when the reaction was carried out in the presence of carbon dioxide.

It is to be understood that the above description is merely illustrative of preferred embodiments of the invention, of which many variations may be made by those skilled in the art without departing from the spirit thereof.

I claim:

1. A method for transforming organic compounds, catalytically convertible in the presence of acidic catalyst sites, which comprises passing the same through a reaction zone containing a catalyst of a crystalline aluminosilicate salt, maintained under conversion conditions, introducing into and maintaining during conversion in said reaction zone a gas consisting essentially of carbon dioxide present in an amount sufficient to effectively enhance the activity of said catalyst, which catalyst has rigid three-dimensional networks made up of unit cells characterized by the substantial absence of change in unit cell dimensions upon dehydration and rehydration and a sorption capacity at 760 mm. pressure and 25° C. of at least 4 weight percent of normal butane and collecting the catalytically transformed organic product issuing from said reaction zone.

2. A method for transforming organic compounds, catalytically convertible in the presence of acidic catalyst sites, which comprises passing the same through a reaction zone containing a catalyst selected from the crystalline alkali metal and alkaline earth metal aluminosilicates, maintained under conversion conditions, introducing into and maintaining during conversion in said reaction zone a gas consisting essentially of carbon dioxide present in an amount sufficient to effectively enhance the activity of said catalyst, which catalyst has rigid three-dimensional networks made up of unit cells characterized by the substantial absence of change in unit cell dimensions upon dehydration and rehydration and a sorption capacity at 760 mm. pressure and 25° C. of at least 4 weight percent of normal butane and collecting the catalytically transformed organic product issuing from said reaction zone.

3. A method for transforming organic compopnds, catalytically convertible in the presence of acidic catalyst sites, which comprises passing the same through a reaction zone containing a catalyst of a crystalline alkali metal aluminosilicate, maintained under conversion conditions, introducing into and maintaining during conversion in said reaction zone a gas consisting essentially of carbon dioxide present in an amount sufficient to effectively enhance the activity of said catalyst, which catalyst has rigid three-dimensional networks made up of unit cells characterized by the substantial absence of change in unit cell dimensions upon dehydration and rehydration, a uniform pore size of about 13 Angstroms in diameter and a sorption capacity at 760 mm. pressure and 25° C. of at least 4 weight percent of normal butane and collecting the catalytically transformed organic product issuing from said reaction zone.

4. A method for transforming organic compounds, catalytically convertible in the presence of acidic catalyst sites, which comprises passing the same through a reaction zone containing a catalyst of a crystalline sodium aluminosilicate, maintained under conversion conditions, introducing into and maintaining during conversion in said reaction zone a gas consisting essentially of carbon dioxide present in an amount sufficient to effectively enhance the activity of said catalyst, which catalyst has rigid three-dimensional networks made up of unit cells characterized by the substantial absence of change in unit cell dimensions upon dehydration and rehydration, a uniform pore size of about 13 Angstroms in diameter and a sorption capacity at 760 mm. pressure and 25° C. of at least 4 weight percent of normal butane and collecting the catalytically transformed organic product issuing from said reaction zone.

5. A method for transforming organic compounds, catalytically convertible in the presence of acidic catalyst sites, which comprises passing the same through a reaction zone containing a catalyst of a crystalline calcium aluminosilicate, maintained under conversion conditions, introducing into and maintanining during conversion in said reaction zone a gas consisting essentially of carbon dioxide present in an amount sufficient to effectively enhance the activity of said catalyst, which catalyst has rigid three-dimensional networks made up of unit cells characterized by the substantial absence of change in unit cell dimensions upon dehydration and rehydration, a uniform pore size of about 10 Angstroms in diameter and a sorption capacity at 760 mm. pressure and 25° C. of at least 4 weight percent of normal butane and collecting the catalytically transformed organic product issuing from said reaction zone.

6. A method which comprises cracking a hydrocarbon charge by passing the same through a reaction zone containing a catalyst of a crystalline aluminosilicate salt, maintained under catalytic cracking conditions, introducing into and maintaining during conversion in said reaction zone a gas consisting essentially of carbon dioxide present in an amount sufficient to effectively enhance the activity of said catalyst, which catalyst has rigid three-dimensional networks made up of unit cells characterized by the substantial absence of change in unit cell dimensions upon dehydration and rehydration and a sorption capacity at 760 mm. pressure and 25° C. of at least 4 weight percent of normal butane and collecting the catalytically cracked product issuing from said reaction zone.

7. A method for cracking a normally paraffin hydrocarbon, having a carbon chain of from 5–30 carbon atoms, which comprises passing the same through a reaction zone containing a catalyst selected from crystalline alkali metal and alkaline earth metal aluminosilicates, maintained under conversion conditions, introducing into and maintaining during coversion in said reaction zone a gas consisting essentially of carbon dioxide present in an amount sufficient to effectively enhance the activity of said catalyst, which catalyst has rigid three-dimensional networks made up of unit cells characterized by the substantial absence of change in unit cell dimensions upon dehydration and rehydration and a sorption capacity at 760 mm. pressure and 25° C. of at least 4 weight percent of normal butane and collecting the catalytically cracked product issuing from said reaction zone.

8. A method for cracking a hydrocarbon charge which comprises passing the same through a reaction zone containing a catalyst of a crystalline sodium aluminosilicate, maintained under catalytic cracking conditions, introducing into and maintaining during conversion in said reaction zone a gas consisting essentially of carbon dioxide present in an amount sufficient to effectively enhance the activity of said catalyst, which catalyst has rigid three-dimensional networks made up of unit cells characterized by the substantial absence of change in unit cell dimensions upon dehydration and rehydration, a uniform pore size of about 13 Angstroms in diameter and a sorption capacity at 760 mm. pressure and 25° C. of at least 4 weight percent of normal butane and collecting the catalytically cracked product issuing from said reaction zone.

9. A method for cracking a hydrocarban charge which comprises passing the same through a reaction zone containing a catalyst of a crystalline calcium aluminosilicate, maintained under catalytic cracking conditions, introducing into and maintaining during conversion in said reaction zone a gas consisting essentially of carbon dioxide present in an amount sufficient to effectively enhance the activity of said catalyst, which catalyst has rigid three-dimensional networks made up of unit cells characterized by the substantial absence of change in unit cell dimensions upon dehydration and rehydration, a uniform pore size of about 10 Angstroms in diameter and a sorption capacity at 760 mm. pressure and 25° C. of at least 4 weight percent of normal butane and collecting the catalytically cracked product issuing from said reaction zone.

10. A method for effecting dehydration of an alcohol having from 3 to 6 carbon atoms which comprises passing the same through a reaction zone containing a catalyst of a crystalline aluminosilicate salt, maintained under catalytic dehydration conditions, introducing into and maintaining during conversion in said reaction zone a gas consisting essentially of carbon dioxide present in an amount sufficient to effectively enhance the activity of said catalyst, which catalyst has rigid three-dimensional networks made up of unit cells characterized by the substantial absence of change in unit cell dimensions upon dehydration and rehydration and a sorption capacity at 760 mm. pressure and 25° C. of at least 4 weight percent of normal butane and collecting the catalytically dehydrated product issuing from said reaction zone.

11. A method for effecting dehydration of a normal alcohol having from 3 to 6 carbon atoms to form an ether which comprises passing said alcohol through a reaction zone containing a catalyst selected from crystalline alkali metal and alkaline earth metal aluminosilicates, maintained under catalytic dehydration conditions, introducing into and maintaining during conversion in said reaction zone a gas consisting essentially of carbon dioxide present in an amount sufficient to effectively enhance the activity of said catalyst, which catalyst has rigid three-dimensional networks made up of unit cells characterized by the substantial absence of change in unit cell dimensions upon dehydration and rehydration and a sorption capacity at 760 mm. pressure and 25° C. of at least 4 weight percent of normal butane and collecting the ether issuing from said reaction zone.

12. A method for effecting dehydration of an isoalcohol having from 3 to 6 carbon atoms to form an olefin which comprises passing said alcohol through a reaction zone containing a catalyst selected from crystalline alkali metal and alkaline earth metal aluminosilicates, maintained under catalytic dehydration conditions, introducing into and maintaining during conversion in said reaction zone a gas consisting essentially of carbon dioxide present in an amount sufficient to effectively enhance the activity of said catalyst, which catalyst has rigid three-dimensional networks made up of unit cells characterized by the substantial absence of change in unit cell dimensions upon dehydration and rehydration and a sorption capacity at 760 mm. pressure and 25° C. of at least 4 weight percent of normal butane and collecting the olefin issuing from said reaction zone.

13. A method for effecting dehydration of an alcohol having from 3 to 6 carbon atoms which comprises passing the same through a reaction zone containing a catalyst of a crystalline alkaline metal aluminosilicate, maintained under catalytic dehydration conditions, introducing into and maintaining during conversion in said reaction zone a gas consisting essentially of carbon dioxide present in an amount sufficient to effectively enhance the activity of said catalyst, which catalyst has rigid three-dimensional networks made up of unit cells characterized by the substantial absence of change in unit cell dimensions upon dehydration and rehydration, a uniform pore size to about 13 Angstroms in diameter and a sorption capacity at 760 mm. pressure and 25° C. of at least 4 weight percent of normal butane and collecting the catalytically dehydrated product issuing from said reaction zone.

14. A method for effecting isomerization of an olefin which comprises passing the same through a reaction zone containing a catalyst of a crystalline aluminosilicate salt maintained under catalytic isomerization conditions, introducing into and maintaining during conversion in said reaction zone a gas consisting essentially of carbon dioxide present in an amount sufficient to effectively enhance the activity of said catalyst, which catalyst has rigid three-dimensional networks made up of unit cells characterized by the substantial absence of change in unit cell dimensions upon dehydration and rehydration and a sorption capacity at 760 mm. pressure and 25° C. of at least 4 weight percent of normal butane and collecting the catalytically isomerized product issuing from said reaction zone.

15. A method for effecting isomerization of an olefin which comprises passing the same through a reaction zone containing a catalyst of a crystalline alkali metal aluminosilicate, maintained under catalytic isomerization conditions, introducing into and maintaining during conversion in said reaction zone a gas consisting essentially of carbon dioxide present in an amount sufficient to effectively enhance the activity of said catalyst, which catalyst has rigid three-dimensional networks made up of unit cells characterized by the substantial absence of change in unit cell dimensions upon dehydration and rehydration, a uniform pore size of about 13 Angstroms in diameter and a sorption capacity at 760 mm. pressure and 25° C. of at least 4 weight percent of normal butane and collecting the catalytically isomerized product issuing from said reaction zone.

References Cited in the file of this patent

UNITED STATES PATENTS

| | | |
|---|---|---|
| 1,914,722 | Jaeger | June 20, 1933 |
| 2,035,189 | Ramage | Mar. 24, 1936 |
| 2,217,252 | Hoog | Oct. 8, 1940 |
| 2,395,274 | Hillyer et al. | Feb. 19, 1946 |
| 2,495,262 | Keith | Jan. 24, 1950 |
| 2,542,488 | Dinwiddie | Feb. 20, 1951 |
| 2,617,712 | Bond | Nov. 11, 1952 |
| 2,900,430 | Henke et al. | Aug. 18, 1959 |
| 2,904,607 | Mattox et al. | Sept. 15, 1959 |
| 2,920,122 | Milton et al. | Jan. 5, 1960 |
| 2,921,026 | Fleck et al. | Jan. 12, 1960 |